United States Patent [19]
Nishikawa

[11] Patent Number: 5,372,863
[45] Date of Patent: Dec. 13, 1994

[54] LAMINATE-TUBE CONTAINER IMPROVED IN BARRIER PROPERTY AT SHOULDER THEREOF

[75] Inventor: Kazuo Nishikawa, Yao, Japan

[73] Assignee: Kansai Tube Co., Ltd., Japan

[21] Appl. No.: 55,957

[22] Filed: Apr. 30, 1993

Related U.S. Application Data

[63] Continuation of Ser. No. 744,310, Aug. 13, 1991, abandoned.

[30] Foreign Application Priority Data

Aug. 30, 1990 [JP] Japan .................. 2-226652

[51] Int. Cl.$^5$ .................. B32B 27/00; B65D 65/00
[52] U.S. Cl. .................. 428/36.6; 428/36.7; 428/36.91; 428/36.92; 428/500; 222/106; 222/107; 206/277; 206/524.2; 206/524.6
[58] Field of Search .................. 428/36.6, 36.7, 36.91, 428/411.1, 36.92, 500; 222/106, 107; 206/277, 524.2, 524.6

[56] References Cited

U.S. PATENT DOCUMENTS

| | | |
|---|---|---|
| 4,610,914 | 9/1986 | Newsome .................. 428/36.7 |
| 4,705,708 | 11/1987 | Briggs et al. .................. 428/36.7 |

FOREIGN PATENT DOCUMENTS

| | | | |
|---|---|---|---|
| 0322891 | 7/1989 | European Pat. Off. | ...... B32B 27/08 |
| 0142650 | 11/1980 | Japan | ...... B32D 27/32 |

OTHER PUBLICATIONS

Derwent Abstract of Japan Patent No. JP-A-55 139 228, Oct. 31, 1980.
Derwent Abstract of Japan Patent No. JP-A-2 175 151, Jul. 6, 1990.
Derwent Abstract of Japan Patent No. JP-A-1 168 424, Jul. 3, 1989.
Derwent Abstract of Japan Patent No. JP-A-54 163 184, Dec. 25, 1979.

*Primary Examiner*—Charles R. Nold
*Attorney, Agent, or Firm*—Flynn, Thiel, Boutell & Tanis

[57] ABSTRACT

A laminate-tube container having a shoulder with improved barrier properties is characterized in that the shoulder comprises a material composed of (A) 0 to 50% by weight of polyethylene, (B) 10 to 50% by weight of an ethylene-vinyl alcohol copolymer or a saponified ethylene-vinyl acetate copolymer and (c) 10 to 90% by weight of a carboxylic acid-modified adhesive polyethylene resin. The laminate-tube is markedly improved in the gas barrier property at the shoulder thereof and, thus, the quality of the contents of the container can be maintained for a long period of time. The laminate-tube container according to the present invention is extremely useful as containers used for toothpaste, medicine, food, drinks, adhesives or the like.

5 Claims, 1 Drawing Sheet

LAMINATE-TUBE CONTAINER IMPROVED IN BARRIER PROPERTY AT SHOULDER THEREOF

This application is a continuation of U.S. Ser. No. 07/744,310, filed Aug. 13, 1991, now abandoned.

BACKGROUND OF THE INVENTION

1. Field of the Invention

The present invention relates to a laminate-tube container to be used for toothpaste, food, cosmetics, medicine, adhesives or the like.

2. Description of the Prior Art

As a container to be used for toothpaste, food, cosmetics, medicine, adhesives or the like, a laminate-tube type container is available (refer to FIG. 1). The body of such a container is given a barrier property by an aluminum foil or an ethylene-vinyl alcohol copolymer, etc. However, since the shoulder (part A of FIG. 1) formed in the discharge side of the container is usually made of a material comprising a single resin such as polyethylene and has poor gas barrier properties, there have arisen various problems such that the contents of the container, such as perfume, are released through the shoulder, while gases contained in the outer atmosphere, such as oxygen, enter the container through the shoulder, thus changing the quality of the contents.

In order to cope with these problems, there are available several methods, for example, a method in which a laminate-tube container is fitted with a doughnut-shaped member containing an aluminum foil at the inside or outside of the shoulder of the container (rondelle type as shown in FIG. 2), a method in which a container is equipped with a cup-shaped member extending from the shoulder to the inside of the opening of the container (membrane rondelle type as shown in FIG. 3), or a method in which a preformed member of a resin having a high barrier property, such as polybutylene terephthalate (PBT), is installed on the container.

However, the practical use of these methods is hampered by a decrease in productivity, for example, with an increase in the number of processing steps, resulting in a higher production cost.

SUMMARY OF THE INVENTION

In view of the above, it is an object of the present invention to provide a laminate-tube container having improved barrier properties at the shoulder thereof by utilizing the conventional laminate tube production process as such.

In order to solve the foregoing problem, the present inventors have intensively investigated a variety of shoulder materials for a laminate-tube container and finally accomplished the present invention on the basis of the finding that a specific resin blend is effective as a shoulder material for the container.

Namely the present invention relates to a laminate-tube container having a shoulder with improved barrier properties, which is characterized in that the shoulder comprises a material composed of (A) 0 to 50% by weight of polyethylene, (B) 10 to 50% by weight of an ethylene-vinyl alcohol copolymer or a saponified ethylene-vinyl acetate copolymer and (c) 10 to 90% by weight of a carboxylic acid-modified adhesive polyethylene resin.

DETAILED DESCRIPTION OF THE PREFERRED EMBODIMENTS

Figure 1:
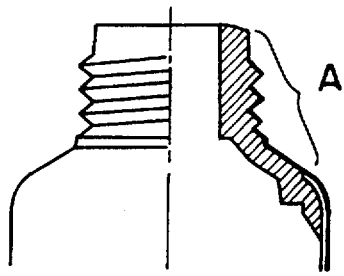
FIG. 1 is a schematic view of a laminate-tube container of the present invention.
Figure 2:
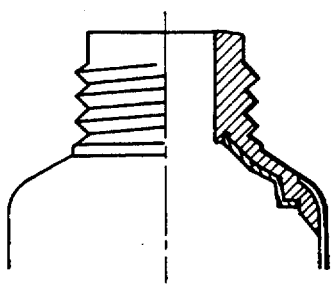
FIG. 2 and FIG. 3 are each a schematic view of a conventional laminate-tube container.
Figure 3:
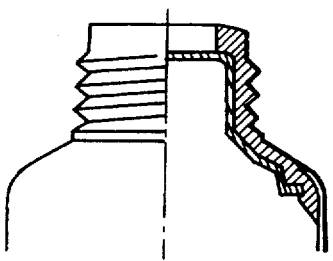

Now a description will be given to resin materials for a laminate-tube shoulder to be used in the present invention.

The shoulder of a laminate-tube container according to the present invention is formed from a single layer of a melt-blended resin composition comprising (A) polyethylene, (B) an ethylene-vinyl alcohol copolymer or a saponified ehylene-vinyl acetate copolymer and (C) a carboxylic acid-modified adhesive polyethylene resin.

A composition composed of components A and B only is poor in miscibility of the components A and B, cannot give a homogeneous dispersion and fails in achieving a sufficient improvement in gas barrier property.

As (A) polyethylene, there are available high-density polyethylene (HDPE), medium-density polyethylene, low-density polyethylene and linear low-density polyethylene (LLDPE), among which high-density polyethylene is preferable.

In regard to (B) the ethylene-vinyl alcohol copolymer or saponified ethylene-vinyl acetate copolymer, the gas barrier property increases with a decrease in the ethylene comonomer content (mol %) in the copolymer. However, a decrease in this content causes insufficient adhesion and a decrease in flexural strength when the shoulder and body of a laminate tube are adhesion-molded by compression molding. In view of the above, a copolymer with an ethylene comonomer content of 32 mol % is used in the Example as hereinafter described.

With respect to component (C), modification with a carboxylic acid is preferably effected with maleic anhydride. Specifically, a commercially available product sold under the tradename of Modic (a product of Mitsubishi Petrochemical Co., Ltd.), Admer (a product of Mitsui Petrochemical Industries Ltd.) or the like can be used as the component (C) of present invention.

The compounding ratio by weight of the components (A), (B) and (C) is 0 to 50: 10 to 50: 10 to 90, preferably 0 to 50: 30 to 50: 30 to 50 taking into consideration the moldability of the resin composition.

A laminate-tube container according to the present invention can be greatly improved in gas barrier properties as compared with conventional products by the shoulder composed of a resin composition comprising the above-mentioned components (A), (B) and (C).

It is important in the laminate-tube container according to the present invention that the material as selected above be used in the shoulder thereof. On the other hand, other parts of the container than the shoulder thereof may be composed of any conventional material, and also the conventional production process may be applied to the container of the present invention. It goes without saying that the whole of a tube container may be constituted of the melt-blended material comprising the aforementioned components (A), (B) and (C).

The present invention will now be described in more detail by referring to the following Example.

EXAMPLE

Three types of laminate-tube containers having different shoulder materials from each other were produced.

In order to evaluate the gas barrier property of each of the containers, the oxygen permeation rate of each of the containers was determined. The results are given in the Table.

TABLE

| | | Comp. Ex. | Ex. 1 | Ex. 2 |
|---|---|---|---|---|
| Composition | (A) | 100 | 20 | 20 |
| | (B) | | 30 | 40 |
| (% by weight) | (C) | | 50 | 40 |
| Oxygen permeation rate (cc/pkg.day.atm) | | 0.267 0.3215 | 0.0475 | 0.0300 |

Note:
(A) HDPE (high-density polyethylene)
(B) Eval (tradename of Kuraray Co., Ltd.)
(C) MODIC (tradename of Mitsubishi Petrochemical Co., Ltd.)

As is obvious from the above Table, a laminate tube having a shoulder constituted of the resin composition based on the three foregoing specific components according to the present invention exhibits an oxygen barrier performance of approximately 6 to 10 times greater than that of conventional laminate tubes.

As described hereinbefore, a laminate-tube container according to the present invention is markedly improved in gas barrier properties at the shoulder thereof. Accordingly, the quality of the contents of the container can be maintained for a long period of time and, further, the quality assurance period by a manufacturer is greatly extended without the release of aroma or volatile components through the shoulder or cause of any change in the quality of the contents.

Consequently, a laminate-tube container according to the present invention is extremely useful as containers used for toothpaste, medicine, food, drinks, adhesives or the like.

What is claimed is:

1. A laminate-tube container comprising a body portion, a neck portion and a shoulder portion joining said neck portion to said body portion, said shoulder portion being formed from a single layer of a melt-blended resin composition consisting essentially of (A) 0 to 50% by weight of polyethylene, (B) 10 to 50% by weight of a member selected from the group consisting of an ethylene-vinyl alcohol copolymer and a saponified ethylene-vinyl acetate copolymer and (C) 10 to 90% by weight of a carboxylic acid-modified adhesive polyethylene resin.

2. The laminate-tube container of claim 1, wherein said melt-blended resin composition consists essentially of (A) 0 to 50% by weight polyethylene, (B) 30 to 50% by weight of a member selected from the group consisting of an ethylene-vinyl alcohol copolymer and a saponified ethylene-vinyl acetate copolymer and (C) 30 to 50% by weight of a carboxylic acid-modified adhesive polyethylene resin.

3. The laminate-tube container of claim 1, wherein said melt-blended resin composition consists essentially of (A) 20 weight % polyethylene, (B) 30 weight % of a member selected from the group consisting of an ethylene-vinyl alcohol copolymer and a saponified ethylene-vinyl acetate copolymer and (C) 50 weight % of a carboxylic acid-modified adhesive polyethylene resin.

4. The laminate-tube container of claim 1, wherein said melt-blended resin composition consists essentially of (A) 20 weight % polyethylene, (B) 40 weight % of a member selected from the group consisting of an ethylene-vinyl alcohol copolymer and a saponified ethylene-vinyl acetate copolymer and (C) 40 weight % of a carboxylic acid-modified adhesive polyethylene resin.

5. The laminate-tube container of claim 1, wherein said neck portion and said shoulder portion are integrally formed from said melt-blended resin composition.

* * * * *